United States Patent Office 3,394,189
Patented July 23, 1968

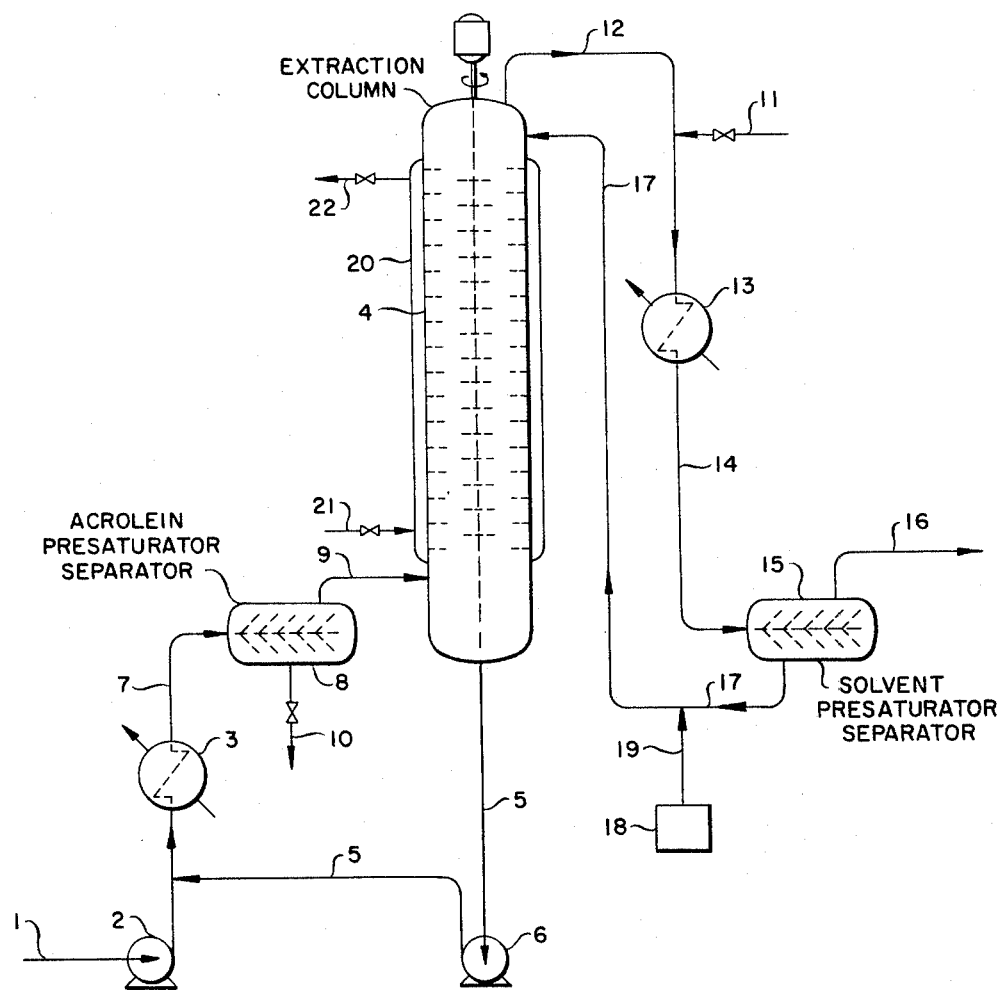

3,394,189
ACROLEIN PURIFICATION
Frank B. West, Kensington, and Albert T. Kister, Albany, Calif., assignors to Shell Oil Company, New York, N.Y., a corporation of Delaware
Filed Dec. 28, 1964, Ser. No. 421,293
3 Claims. (Cl. 260—601)

ABSTRACT OF THE DISCLOSURE

In the liquid phase extraction of impure acrolein with water, at 18–40° F., in an externally cooled extraction zone, the steps of presaturating the impure acrolein feed by direct contact with a portion of the extract phase, and presaturating the aqueous solvent by direct contact with a portion of the raffinate phase.

---

This invention relates to an improved process for the purification of acrolein containing impurities consisting essentially of saturated aldehydes and ketones having boiling temperatures closely approximating that of acrolein by liquid-liquid extraction with water. The invention relates more specifically to a process for the purification of crude acrolein, obtained by catalytic partial oxidation of propylene, by low temperature water extraction.

The importance of acrolein in chemical industry and its increased use often requires a product of a high degree of purity. It is well known that when acrolein is manufactured by the oxidation of propylene other products are formed which have boiling temperatures closely approximating that of acrolein and are difficult to separate therefrom by ordinary fractionating means. These products consist mostly of saturated aldehydes and ketones having the same number of carbon atoms as acrolein, such as propionaldehyde and acetone, but also include other impurities such as acetaldehyde and allyl alcohol. It is highly desirable in manufacturing most acrolein derivatives that these impurities be removed from the acrolein. Propionaldehyde and acetone are the major impurities and are the most difficult to separate. In the past, purification schemes for producing highly pure acrolein have often been too expensive to operate at a manufacturing level or have not yielded a product of the desired purity.

It is an object of the present invention to provide an improved process for the purification of crude acrolein wherein essentially all impurities are removed.

It is a further object of this invention to provide an improved process for the purification of acrolein wherein saturated aldehydes and ketones having a boiling temperature closely approximating that of acrolein are removed.

A particular object of the invention is the more efficient production of a highly pure acrolein of at least 99% + purity when calculated on a water free basis. Other objects and advantages of the invention will become apparent from the following detailed description thereof, which will be made in part with reference to the accompanying drawing, wherein the sole figure illustrates diagrammatically one form of apparatus suitable for carrying out the process of the invention.

In accordance with the present invention, highly pure acrolein is obtained by contacting impure acrolein, containing impurities comprising saturated aldehydes and ketones having boiling temperatures closely approximating that of acrolein, in a countercurrent extraction zone with an aqueous solvent flowing countercurrent to the impure acrolein at a temperature of from about 18° to about 40° F. This countercurrent liquid-liquid extraction forms a raffinate phase consisting essentially of acrolein containing a minor amount of aqueous solvent substantially free of any organic impurities and an extract phase consisting essentially of aqueous solvent containing the organic impurities and saturated with acrolein. The extract phase is withdrawn from the extraction zone and is contacted with impure acrolein prior to its introduction into the extraction zone. This operation substantially saturates the impure acrolein with aqueous solvent and enables a more uniform distribution of acrolein in the extraction zone. The raffinate phase is withdrawn from the extraction zone and is contacted with aqueous solvent prior to introduction of the latter into the extraction zone. The acrolein raffinate saturates the incoming aqueous solvent with acrolein thereby lowering the freezing temperature of the solvent and allowing operation at temperatures which ordinarily would freeze the aqueous solvent but which are more favorable to the extraction of impurities.

The external presaturation zones, wherein the impure acrolein is first contacted with aqueous extract and the acrolein raffinate is contacted with fresh aqueous solvent, also serves the function or liberating the heat of solution of acrolein outside the extraction zone. The heat thus removed can be eliminated from the system more conveniently than it could from the extraction zone.

Without intent to limit the scope of the presently claimed invention by any theories advanced herein to set forth more fully the nature thereof, it is believed that production of high purity acrolein from mixtures containing acrolein and organic impurities consisting essentially of saturated aldehydes and ketones by low temperature water extraction depends upon hydration of the saturated aldehydes to be separated. In crude acrolein obtained by controlled partial oxidation of propylene, these impurities are generally present in amounts varying from about 10–16% and in the finished acrolein these impurities are present in no more than small quantities and generally not above about 2–5%. At the relatively low temperatures and the estimated residence employed in the present process, acrolein does not undergo substantial hydration whereas the saturated aldehydes are almost completely hydrated. While hydrate formation may be accomplished using water at a low temperature it is preferred to add to the water a small quantity of an acid which increases the rate of hydrate formation of the saturated carbonylic impurities. Various acids may be used, the only requirement being that the acid not react to any substantial degree with the acrolein or impurities being separated. Acids which may be employed include mineral acids such as sulfuric acid, hydrochloric acid, nitric acid, phosphoric acid and the like. Organic acids such as acetic, propionic, benzoic, oxalic and the like may also be used. Phosphoric acid is especially preferred.

The temperature range should be maintained in the low temperature range defined herein since at high temperatures, acrolein becomes increasingly more soluble in the aqueous solvent and water more soluble in the acrolein raffinate. Temperatures under about 40° F. may be used and it is preferable to operate at temperatures in the range of from about 18 to about 32° F. In a preferred embodiment of the invention a constant temperature in the neighborhood of about 32° F. is used.

The present invention may be carried out in any suitable counter-current liquid-liquid extraction zone. For example, use may be made of columns with Raschig rings or other fillers, baffle plates, perforated plates, wire gauze or the like. Particularly preferred, however, is the use as extraction zone of rotating disc contactors which comprise extraction columns provided with a rotatable shaft with rotor discs attached thereto, and with stator rings attached to the inner wall of the column, as described in Netherlands Patent 67,932 and in "Chemical Engineering Progress," volume 51 (1955), pages 141–146.

Since the extraction operates at temperatures near or below the normal freezing temperature of water, it is necessary to provide means whereby the aqueous solvent introduced into the extraction zone is maintained in liquid form. This is accomplished by means of a presaturation step. In this step, the water to be used as the solvent is mixed with acrolein raffinate from the extractor in a separate zone outside the extraction zone and cooled therein to the operating temperature. This step saturates the water with acrolein raffinate thereby producing a solvent having a substantially lower freezing temperature, for example, approximately 18° F., which may then be acidified and introduced into the extraction zone in liquid form. This step also serves an added function. The acrolein raffinate coming from the extraction zone contains a certain amount of acid which, if not removed, would tend to polymerize the acrolein. This acid is washed out by the incoming water upon contact in the presaturation zone. This step thereby greatly improves the storage stability of the highly pure acrolein produced in the process.

The interfacial tension between the extract and raffinate phases is very low in the bottom stage of the extractor but becomes progressively higher throughout the column. Because of the low interfacial tension at the bottom of the extractor, the tendency toward flooding is increased. It has been found that alleviation of the flooding tendency in the bottom of the extraction column near the acrolein feed entrance while simultaneously providing a more uniform loading at the extraction column, is brought about by providing a contacting zone external to the extractor wherein the impure acrolein charge is contacted with extract from the extraction zone. In the separate contacting in the presaturation zone, the impure acrolein charge is saturated with the aqueous solvent, cooled to operating temperature, and the resulting mixture subjected to phase separation. The upper or aqueous saturated impure acrolein phase is then fed into the bottom of the extraction column, thereby eliminating the flooding tendency at the bottom of the extraction column and providing a more uniform loading of the acrolein phase throughout the column.

In order to set forth more fully the nature of the invention, reference will be had, in the following detailed description thereof, to the accompanying drawing.

Impure acrolein containing organic carbonylic impurities comprising saturated aldehydes and ketones having boiling temperatures closely approximating that of acrolein, obtained from an outside source, such as from the catalytic oxidation of propylene, is forced through line 1, by means of pump 2, into cooler 3 where it is cooled to a temperature of approximately 32° F. and saturated by direct contact with aqueous extract emanating from the bottom of extraction column 4 through line 5 provided with a pump 6. The cooled acrolein-aqueous extract saturated mixture is fed through line 7 into presaturator-separator 8 wherein the crude acrolein saturation with the aqueous extract becomes complete and phase separation takes place. The upper phase consisting essentially of impure acrolein saturated with aqueous extract is fed through line 9 into the lower portion of extraction column 4. The lower aqueous extract phase from presaturator-separator 8, consisting essentially of acidified water saturated with acrolein and containing the extracted organic carbonylic impurities is withdrawn by valved line 10 which may suitably lead to an acrolein stripper (not shown) for recovering the impure acrolein from the aqueous extract.

Water is introduced into the system by line 11 and mixes with and becomes saturated by the cold acrolein raffinate passing out of the top of extraction column 4 via line 12. The water-raffinate mixture is cooled to about 32° F. in cooler 13 and is fed throughline 14 into presaturator-separator 15 wherein the water becomes completely saturated with acrolein and also takes up any acid remaining in the raffinate phase. The mixture separates into two phases in presaturator-separator 15. The upper or raffinate phase consists of essentially pure acrolein and is removed from the system through line 16.

The degree of purity of the acrolein so removed through line 16 will depend to some extent upon the amount and type of impurities in the crude acrolein charged. When the acrolein charge is subjected to an initial treatment, such as, for example, distillation, scrubbing or the like, to effect the removal of high boiling impurities, the raffinate phase will consist of acrolein having at least 99 percent purity calculated on a water free basis and the water content will be approximately about 5 percent by weight. If crude acrolein constitutes the charge, the raffinate phase in presaturator-separator 15 may contain a minor amount of the higher boiling impurities originally present in addition to about 5 percent by weight of water. To eliminate residual higher boiling impurities and reduce its water content, the upper phase removed from presaturator-separator 15 through line 16 may be distilled in a distillation zone, not shown, for example, by azeotropic distillation at reduced pressure, thereby producing a pure acrolein product containing more than 99 percent acrolein on a water free basis and containing no more than about 0.8 percent water. The purified acrolein may be stabilized by addition of hydroquinone before being sent to storage.

The lower or aqueous solvent phase is withdrawn from presaturator-separator 15 through line 17, wherein it may be mixed with phosphoric acid emanating through line 19 from drum 18, in an amount of about 0.01 percent by weight of the aqueous solvent. The presaturated aqueous solvent is introduced into the upper portion of extraction column 4 through line 17, and passes downwardly through column 4 countercurrent to the impure acrolein charge. Within column 4 hydration of the saturated aldehydes takes place, thereby permitting their effective extraction into the aqueous extract phase.

To assure the maintaining of the temperature in column 4 within the permissible range defined herein, it is essential that provision be made to avoid substantial heat introduction into the column by radiation and conduction from the surrounding atmosphere. In addition, it is essential that heat generated within the column, comprising, for example, heat of solution of the carbonylic impurities and heat resulting from mechanical agitation, be removed substantially as formed. To achieve this effect the column 4 may be provided with suitable conventional means comprising, for example, lagging and the like not shown in the drawing. The column 4 is preferably provided with a jacket 20 enabling direct contact of the exterior surface of the column wall with suitable heat carrying media such as, for example, hydrocarbons, ethylene glycol and water solutions and the like. Valved lines 21 and 22 are provided for introducing such heat carrying fluids capable of functioning as cooling media into cooling jacket 20 and its removal therefrom. Suitable cooling media comprise the lower boiling hydrocarbons such as propane, propylene, butane, pentane and the like, employed in conjunction with suitable refrigerating means. Use may be made of boiling liquids, such as the lower boiling hydrocarbons, in the jacket 20 and the boiling temperatures thereof controlled by control of the pressure maintained in the cooling jacket 20.

The following examples are illustrative of the invention. The numbers in brackets in the examples identify the parts of apparatus indicated by identical reference character in the drawing.

Example I

In a continuous operation, cooled, crude acrolein 1 obtained by cuprous oxide-catalyzed vapor phase oxidation of propylene, having the weight composition given in Column A of Table I was mixed at the rate of 2608 lb. per hour with 5460 lb. per hour of cold aqueous extract emanating (5) from a rotating disc contactor 4. The resulting mixture, now at a temperature of 32° F. was introduced into charge precontactor 8 wherein phase separation was allowed to take place. The lower, aqueous phase, having the weight composition given in Column B of Table I was continuously removed from the charge precontactor 8 and sent (10) to a distillation zone wherein acrolein components were recovered therefrom and were partially recycled to the charge precontactor 8. The upper acrolein phase was passed (9) continuously from the charge precontactor 8 into the lower part of a rotary disc contactor 4. The rotary disc contactor was provided with a cooling jacket containing boiling propylene.

Cooled water 11 to be used as solvent containing 0.01% hydroquinone was mixed at the rate of 3634 lb. per hour with 7837 lb. per hour of cold extractor raffinate having the weight composition given in Column C of Table I coming from the upper part 12 of the rotary disc contactor 4. The resulting mixture was cooled (13) to 32° F. and introduced into a solvent presaturator 15 wherein phase separation was allowed to take place. To the resulting aqueous phase there was added 0.5 lb. per hour of phosphoric acid 19. The resulting acidified aqueous phase was fed (17) into the top of the rotary disc contactor 4 and passed downwardly therethrough countercurrent to the presaturated impure acrolein feed. The temperature within the rotary disc contactor 4 was maintained at 32° F.

The upper acrolein phase separated in solvent presaturator 15 was withdrawn therefrom (16) and subjected to a vacuum distillation in a column operated at 100 mm. Hg and at a temperature of 65° F. The distillation bottoms, having the weight composition given in Column D at Table I were withdrawn at the rate of 123 lb. per hour. Acrolein products, obtained as distillation overhead at the rate of 660 lb. per hour had the weight composition given in Column E of Table I.

TABLE I

| Components | A | B | C | D | E |
|---|---|---|---|---|---|
| Acetaldehyde | 12.68 | 6.05 | 0.01 | | 0.01 |
| Propylene Oxide | 0.31 | 0.12 | 0.20 | | 0.24 |
| Propionaldehyde | 2.04 | 0.90 | 0.50 | 0.33 | 0.53 |
| Acetone | 1.10 | 0.53 | | | |
| Acrolein | 69.08 | 19.80 | 92.10 | 49.92 | 98.30 |
| Methacrolein | 0.16 | 0.04 | 0.25 | 1.30 | 0.06 |
| Methyl Ethyl Ketone | 0.03 | | 0.10 | 0.65 | |
| Isoporpyl Alcohol | 0.33 | 0.15 | 0.08 | 0.49 | |
| Ethyl Alcohol | 0.05 | 0.02 | | | |
| Benzene | 0.06 | 0.01 | 0.10 | 0.33 | 0.06 |
| Methyl Vinyl Ketone | 0.13 | 0.05 | 0.06 | 0.41 | |
| Unknowns | 0.77 | 0.21 | 1.10 | 7.00 | |
| Allyl Alcohol | 2.76 | 1.29 | 0.20 | 1.30 | |
| Water | 10.50 | 70.82 | 5.30 | 29.48 | 0.80 |
| Phosphoric Acid | | | | 0.01 | |
| Soluble Acrolein Polymers | | | | 8.79 | |

Example II

The process described in foregoing Example I was repeated under substantially identical conditions but with the exception that an impure acrolein charge having the composition given in Column A of Table II was used and the flow rates were as follows:

Lbs. per hour
Impure acrolein charge (1) _____ 1,698
Water (solvent) charge (11) _____ 3,584
Phosphoric acid (19) _____ 0.4
Aqueous phase of extract withdrawal (10) _____ 4,517
Acrolein phase of raffinate withdrawal (16) _____ 765
Acrolein product overhead from vacuum distillation of acrolein phase of raffinate _____ 657
Distillation bottoms (heavy ends) from vacuum distillation of acrolein phase of raffinate _____ 108

Results obtained in percentage by weight wherein the letters A–E have the same meaning as those in Table I are given in the following Table II.

TABLE II

| Components | A | B | C | D | E |
|---|---|---|---|---|---|
| Acetaldehyde | 0.01 | | | | |
| Propylene Oxode | | 0.15 | 0.08 | | 0.09 |
| Propionaldehyde | 2.91 | 1.04 | 0.32 | 0.19 | 0.33 |
| Acetone | 1.48 | 0.56 | | | |
| Acrolein | 94.32 | 19.50 | 94.19 | 56.76 | 98.72 |
| Methacrolein | 0.10 | 0.01 | 0.15 | 0.74 | 0.04 |
| Methyl Ethyl Ketone | 0.06 | 0.02 | 0.04 | 0.28 | |
| Ethyl Alcohol | 0.07 | 0.03 | | | |
| Benzene | 0.05 | 0.01 | 0.03 | 0.09 | 0.02 |
| Methyl Vinyl Ketone | 0.03 | 0.01 | 0.01 | 0.09 | |
| Allyl Alcohol | 0.48 | 0.16 | 0.08 | 0.56 | |
| Water | 0.05 | 78.50 | 5.10 | 31.30 | 0.80 |
| Phosphoric Acid | | 0.01 | | | |
| Soluble Acrolein Polymers | | | | 10.00 | |

We claim as our invention:

1. In the process for purifying impure acrolein containing organic impurities comprising propionaldehyde and acetone wherein said impure acrolein is subjected to liquid-liquid, countercurrent extraction with an aqueous solvent, at 18–40° F., in an externally cooled contactor, thereby forming a raffinate phase consisting essentially of acrolein containing a minor amount of aqueous solvent, and an extract phase consisting essentially of aqueous solvent and said organic impurities in said contactor, and said raffinate and extract phases are withdrawn separately from said contactor, the improvement consisting essentially of saturating said impure acrolein to be purified with said aqueous solvent by direct contact with said extract phase before introduction into said contactor, and saturating said aqueous solvent with acrolein by direct contact with said raffinate phase before introduction into said contactor.

2. The process according to claim 1 wherein said aqueous solvent is water.

3. The process according to claim 1 wherein the extraction temperature is maintained in a range of from about 18 to about 32° F.

References Cited

UNITED STATES PATENTS 2,574,935  11/1951  Pierotti et al. _____ 260—601 X
2,562,846   7/1951  Reider et al. _____ 260—601 X
2,514,968   7/1950  Dunn _____ 260—601 X BERNARD HELFIN, *Primary Examiner.*

R. H. LILES, *Assistant Examiner.*